United States Patent [19]

Sempio et al.

[11] Patent Number: 5,994,473
[45] Date of Patent: *Nov. 30, 1999

[54] SCORCH RESISTANT PEROXIDIC COMPOSITIONS

[75] Inventors: Carlo Sempio, Busto Arsizio; Giorgio Angeloni, Bollate; Massimo Cesana, Milan; Luciano Abrigo, Alessandria, all of Italy

[73] Assignee: Elf Atochem Italia S.r.l., Milan, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/781,322

[22] Filed: Jan. 10, 1997

[30] Foreign Application Priority Data

Jan. 18, 1996 [IT] Italy ................. MI960029 U

[51] Int. Cl.$^6$ .......................................... C08F 8/00
[52] U.S. Cl. .................... 525/257; 525/267; 525/387; 526/208; 526/227; 526/230; 526/232; 526/232.3
[58] Field of Search ................... 525/387, 257, 525/263; 526/208, 227, 230, 232, 232.3

[56] References Cited

U.S. PATENT DOCUMENTS 3,335,124  8/1967  Larsen ..................... 260/94.9
5,245,084  9/1993  Groepper et al. ............ 568/558
5,292,791  3/1994  Groepper et al. ............ 524/530

FOREIGN PATENT DOCUMENTS 0346863  6/1989  European Pat. Off. .
0504920  3/1992  European Pat. Off. .
0569995  5/1993  European Pat. Off. .
2553094  8/1976  Germany .
2553145  8/1976  Germany .
1535038  12/1978  United Kingdom .

OTHER PUBLICATIONS

"Hawley's Condensed Chemical Dictionary", Eleventh Edition, Sax et al, ed., Van Nostrand Reinhold, New York, 1987, p. 734, 1987.

*Primary Examiner*—Bernard Lipman
*Attorney, Agent, or Firm*—Nikaido Marmelstein Murray & Oram, LLP

[57] ABSTRACT

Peroxidic compositions utilizable for curing elastomers and polyolefins having scorch retardant properties, which comprise:

(A) a peroxide in powder or in the form of granules or master batch
(B)+(C) inhibitor and promoter in powder, granules or master batch, wherein (B) is an inhibitor derived from hydroquinone and (C) is a curing promoter.

6 Claims, No Drawings

SCORCH RESISTANT PEROXIDIC COMPOSITIONS

The present invention relates to peroxidic compositions utilizable for the curing of elastomers and polyolefins in general having an improved scorch resistance and which do not show blooming in the compounds of different olefinic polymers.

More particularly it relates to compositions having a longer scorch time showing, besides the absence of blooming, an optimal combination of properties as indicated below.

For blooming it is generally intended the migration towards the surface of materials incompatible with the polymer. In the compound where said phenomenon takes place, it occurs the separation of the peroxide from the granule with consequent dishomogeneity of the same.

From an industrial point of view this must be avoided since in the vulcanization not uniform degrees of cross-linking are obtained. For instance in the electric cables this causes a decrease of electrical and mechanical characteristics.

Therefore the blooming causes problems when the product is stocked for some months, of the order of six months.

It is well known that organic peroxides are employed for curing elastomers and polyolefins, however for the compound processing it is necessary to have scorch times as long as possible to avoid dangerous precurings.

Further when the compound, comprising the peroxide is stocked for the period indicated above, when it is utilized by the users for cross-linking polymers, such as e.g. polyethylene, elastomers, as ethylene-propylene (EP) or containing also units deriving from a dienic monomer (EPDM), etc., the polymer should crosslink in almost the same time ($t_{90}$) required when the compound is freshly prepared and used without storage and showing almost the same degree of cross-linking (MH). From an industrial point of view the maintenance of almost the same MH and $t_{90}$ means that the entire production cycle can be used unchanged. The decreasing of MH after storage means that the properties of the cross-linked article change; if $t_{90}$ increases means that it is necessary to modify the production cycle in order to adjust it depending on the storage time; this is not desirable since it requires more time and the final polymer has inferior properties.

For increasing the scorching time it is also know that in order to solve this technical problem, organic peroxides having a longer half time life could be utilised, however this has the drawback to require curing times too long to reach the complete curing, to the detriment, therefore, of the productivity.

It is also known to add additives to the peroxidic compositions to increase the scorch time.

See for instance patents DE 2,553,145 and 2,553,094 wherein peroxides with different scorch time are mixed but the drawback resides in that curing times get longer with the inconveniences indicated above.

Additives based on amines are also known, but now they cannot be utilized since they are considered toxicologically dangerous owing to their cancerogeneous effects.

There are known hydroquinones, e.g. di-t-butyl or di-t-amyl, compounds based on sulphur, or antioxidants in general as scorch retardants in peroxidic curing, in this way however the final properties of the cured product are poor.

To solve this technical problem, various compounds already known in curing with sulphur have been utilized, as indicated above, however the above mentioned drawbacks have occurred. See U.S. Pat. No. 3,335,124.

Peroxidic curing systems containing promoters, such as TAIC (triallylioscyanurate) in combination with derivatives of thiourea to increase the scorch time, are also known. (See patent GB 1,535,038).

From the patents U.S. Pat. Nos. 5,292,791 and 5,245,084 in the name of Elf Atochem North America a peroxide composition having scorch retardant properties is described, comprising (a) a peroxide
(b) an hydroquinone derivative
(c) a curing promoter.

All the examples of these patents and the commercial products (Peroximon SR®, SR®G, Sr®A, Luperox SR®, SR®G, SR®A) are sold as mixtures containing the compounds indicated above.

At col. 4, lines 26–29, it is stated that the mixtures are stable to storage.

Experiments carried out by the Applicant have shown that this is true for the scorch properties but the value of MH and $t_{90}$ are affected so that the production cycle mentioned above has to be changed and the cross-linking (MH) is interior.

There was a need to solve the following technical problem: to have available a compound showing the combination of the following properties:

the peroxidic distribution is uniform also after stockage;
to show absence of blooming;
to show a cross-linking degree as measured by MH similar to that obtained by using the compound without storage;
to show a $t_{90}$ not longer than that obtained by using the compound without storage;
to have production cycle with the lower processing time maintaining the scorch resistance efficiency and the optimum of mechanical properties;
to maintain the optical properties (i.e. non changement of the coloration) of the basic polymers not filled with colored fillers or pigments, e.g. carbon black, etc.;

The Applicant has unexpectedly and surprisingly found that it is possible to solve the above technical problem if the components of the mixture of the patents U.S. Pat. Nos. '791 and '084, are utilized separately,

| | |
|---|---|
| (a) | peroxides in powder or in the form of granules or master batch, as defined hereinunder |
| (b) + (c) | inhibitor and promoter in master batch, | give results similar to those of the mixtures prepared by mixing the three components and immediately utilised for curing.

It has been found that the separated mixtures formed by (a) and (b)+(c) can be stored for an undetermined time without giving rise to the disadvantages indicted above.

Compounds b) deriving from hydroquinone have the following formulae

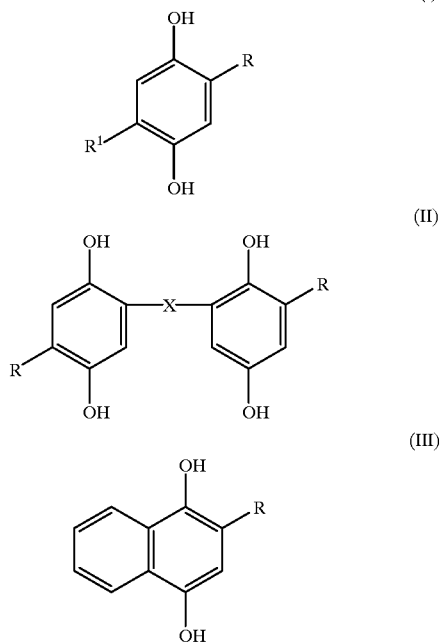

wherein R and $R^1$, equal to or different from each other, have the meaning of hydrogen, ter-alkyl, ter-cycloalkyl or aryl-t-alkyl; X=alkylene $C_1$–$C_{18}$ optionally substituted by alkyl, alkoxy, aromatic or cycloaliphatic groups, Preferably X is —$CH_2CH=CHCH_2$—, —$CH_2$—, —$CH(CH_3)$, —$(CH_3)_2C$— or $C(CH_3)_2$—$C_6H_4$—$C(CH_3)_2$—; hyroquinones of formula III can have the benzenic ring, not containing the OH group, but containing ethylic groups as substituents.

The component a), peroxide, is utilized as well known in the form of powder, granules or master batch. For the powders the compositions in % by weight are for instance:

| | |
|---|---|
| 30–60% | peroxide liquids or solids |
| 40–70% | inorganic inert filler, in powder, preferably |
| 38–45% | peroxide |
| 62–55% | inert filler; | more preferably 40% by weight of peroxide and 60% by weight of inert filler.

Inert fillers are well known and silica, calcium carbonate, kaolin, talc can for instance be mentioned. The sizes are those typical for these applications, for instance of micronized type or of a few microns.

Component a) can also in the form of a paste, or granules by utilizing the fillers indicated above and optionally, inert solvents and/or plastifiers such as for instance paraffin oil.

(b)+(c) can be utilized formulated as said for component a) in the form of powder, granule or master batch.

According to a preferred embodiment, b)+c) is used in the form of a master batch.

The master batch is obtained by adding b) and c) to a polymer, for instance ethylvinylacetate (EVA), high, medium or low density polyethylene (PE), ethylenepropylene copolymers (EP), ethylenepropylene and diene copolymers (EPDM), hydrogenated or not hydrogenated nitrilic rubbers (HNBR), butadiene-styrene rubbers (SBR), polyvinylchloride (PVC), siliconic or fluorinated rubbers.

The polymers used for masterbatch are well known in the art.

Component a) peroxide comprises all the peroxides well known for the curing of elastomers and polyolefins. For instance we can cite the class of dialkylperoxides, such as di-cumylperoxide (Peroximon® DC), di-t-butyl peroxide (Luperox® DI), t-butyl cumyl peroxide (Luperox® 801), 2,5 dimethyl-2,5-bis(t-butylperoxy) hexane (Luperox® 101), 2,5-dimethyl-2,5-bis(t-butyl peroxy)-hexyne (Luperox® 130), α,α'-bis(t-butyl-peroxy-diisopropylbenzene (Peroximon® F), α,α'-bis(t-amyl-peroxy-diisopropylbenzene (Peroximon® 180), di-t-amyl-peroxide (Luperox® DTA), etc.;

the class of perketals:
1,1-bis(t-butylperoxy)-3,3-5-trimethylcyclohexane (Luperox® 231), 1,1-bis(t-butylperoxy)cyclohexane, 2,2'-bis(t-butyl-peroxy) butane, etc.

the class of periesters, such as perbenzoate (Luperox® P).

Mixtures of the peroxides indicated above or mixtures of the single peroxides in the form of different isomers can also be used.

Compounds (b) are for instance mono-t-butyl hydroquinone, mono-t-amyl-hydroquinone, 2-5 di t-amilhydroquinone, etc. Promoters (c) are compounds containing at least 2 polymerizable, bifunctional or polyfunctional double bonds C=C. For instance we can cite di and poli(meth)acrylates, vinylic, allylic monomers, triallylcyanurate (TAC), TAIC, triallylphosphate, triallyltrimethyllate, triallylcitrate, diallylterephthalate, diallyladipate, trimethylolpropane trimethacrilate (TMPTM), ethylenglycol dimethacrylate, trimethylolpropantriacrylate, diallylfumarate, diallylmaleate, m-phenylene bismaleimide.

The amount of component (a) with respect to the polymer to be cured ranges from 0.1–15% by weight, preferably 1–8%; the amount of inhibitor (b) with respect to the polymer ranges from 0.1–10% by weight, preferably 0.1–0.5% by weight; the amount of (c) with respect to the final polymer ranges from 0.1–15% by weight, preferably 0.2–2% by weight.

The weight ratio between (a) and the sum of (b)+(c) is generally comprised between 5:1 and 1:2, preferably 3:1 and the ratio by weight between components (b) and (c) in the mixture (b)+(c) is generally comprised between 1:2 and 0.5:3, preferably 1:2.

An advantage of the present invention with respect to the mixtures of components (a), (b) and (c) commercialized as sole master batch resides in that with the present invention the user can vary the ratio among the components of the two master batch in order to obtain the best results depending on the polymer to be cured.

Therefore the compositions of the present invention have a greater flexibility in practical applications.

Further the compounds of the present invention show the combination of properties indicated above for the technical problem faced by the present invention.

The following examples are given for illustrative purposes but are not limitative of the scope of the present invention.

EXAMPLE 1 (comparative)

A master batch with the following components was prepared, as parts by weight for 100 total parts,

| | | |
|---|---|---|
| (a) Peroximon ® F | 40 | parts |
| (b) 2-ter-amylhydroquinone | 5.5 | " |
| (c) triallylcyanurate (TAC) | 10 | " |
| and with an elastomer EPM (see below) in bambury mixing for 15' | 44.5 | " |

6.9 phr of master batch are utilized for curing an EPM rubber (Dutral® CO054) ethylene-propylene copolymer. The compound had the following formulation:

| | | |
|---|---|---|
| Dutral ® CO054 | 100 | parts |
| Carbon black HAF | 50 | phr |
| Paraffinic oil | 20 | phr |
| zinc oxide | 5 | phr |

Characterization was carried out by employing a Monsanto rheometer and a Monsanto Mooney viscosimeter.

The ODR curve data at 170° C. (oscillating arc=3°; oscillating frequency 100 cycles/minute) are:

| | | | |
|---|---|---|---|
| MH | = | 64.95 | pounds.inch |
| $ts_2$ | = | 60 | seconds |
| $ts_5$ | = | 77 | seconds |
| $t_{10}$ | = | 95 | seconds |
| $t_{90}$ | = | 373 | seconds. |

The ODR curve (Oscillating Disc Rheometer) can be traced with the help of a rotating disk rheometer, according to ASTM-D-2084-71T.

Times are reported in abscissa and the bending torque (pounds.inch) measured with dynamometer, opposed by the polymer to the disk rotation, is reported in ordinata. It was found that the maximum density of curing has a maximum torque value (MH=64.95 pounds.inches) which does not vary any more during the time.

The $t_{10}$ and $t_{90}$ expressions indicate respectively the time necessary to reach a bending torque equal to 10% and to 90% respectively of the maximum bending torque; by $ts_2$ and $ts_5$ it is meant the time necessary to reach a level of 2 pounds.inches and 5 pounds.inch, respectively, above the minimum of the ODR curve.

The characterization of the scorching times by Mooney viscosimetry (135° C.) gave the following results:

| | | |
|---|---|---|
| $ts_3$ | = | 47 min and 48 sec |
| $ts_{10}$ | = | 71 min and 3 sec. |

By "scorching" it is meant the premature curing which undesirably occurs during the compound extrusion, before the coming out of the extruder from the die head; said premature curing is a frequent cause of a stop of the operations.

By scorching time $ts_c$ and $ts_{10}$ (by viscosimetry Mooney) it is meant the necessary time to reach an increase of the minimum value of the viscosity equal to 3 or to 10 Mooney unit, respectively.

The viscosity was determined by a cutting disk Mooney viscosimeter (ASTM D 1646-81).

EXAMPLE 2 (comparative)

Example 1 was repeated without adding the components (b) and (c) and by utilizing a master with the only component (a) peroxide in phr in the same amounts of Ex. 1.

Always 6.9 phr of master are taken and are cured with the formulation of Ex. 1.

The characterization has given the following results:

The ODR curve data at 170° C. (oscillating arc=3°; oscillating frequency 100 cycles/minute) are:

| | | | |
|---|---|---|---|
| MH | = | 36.4 | pounds.inch |
| $ts_2$ | = | 64 | seconds |
| $ts_5$ | = | 87 | seconds |
| $t_{10}$ | = | 90 | seconds |
| $t_{90}$ | = | 480 | seconds |

The characterization of the scorching times by Mooney viscosimetry (135° C.) gave the following results:

| | | |
|---|---|---|
| $ts_3$ | = | 23 min and 39 sec |
| $ts_{10}$ | = | 49 min and 15 sec. |

EXAMPLE 2 BIS (comparative)

Example 2 was repeated by taking 11 phr of master, in order to obtain a MH value similar to that obtained in Example 1, and curing is effected with the formulation of Ex. 1.

The characterization has given the following results:

The ODR curve data at 170° C. (oscillating arc=3°; oscillating frequency 100 cycles/minute) are:

| | | | |
|---|---|---|---|
| MH | = | 59.29 | pounds.inch |
| $ts_2$ | = | 50 | seconds |
| $ts_5$ | = | 66 | seconds |
| $t_{10}$ | = | 89 | seconds |
| $t_{90}$ | = | 420 | seconds. |

The characterization of the scorching times by Mooney viscosimetry (135° C.) gave the following results:

| | | |
|---|---|---|
| $ts_3$ | = | 18 min and 30 sec |
| $ts_{10}$ | = | 38 min and 27 sec. |

From the data it can be concluded that the amount of peroxide has to be further increased to reach the same MH. This is not desirable from an industrial point of view.

EXAMPLE 3

Example 1 was repeated but by utilizing two masters batch, the one containing the component a) peroxide was prepared according to example 2 and 6.9 phr thereof are taken to be utilized in the formulation for 100 parts of rubber.

The masterbatch of (b)+(c) was prepared as follows, for 100 total parts of master:

| | | |
|---|---|---|
| (b) | 24.8 | parts |
| (c) | 45.2 | parts |
| EPM | 30 | parts. |

(as defined above).

It is mixed in bambury for 15' and then extruded in a Brabender extruder to obtain cylindrical granules having a diameter=4 mm and a length of 4 mm.

1.7 phr of these granules are then taken for the formulation to be cured.

The results obtained are the following:

the ODR curve data at 170° C. (oscillating arc=3°; oscillating frequency 100 cycles/minute) are:

| MH | = | 63.53 pounds.inch |
|---|---|---|
| $ts_2$ | = | 64 seconds |
| $ts_5$ | = | 83 seconds |
| $t_{10}$ | = | 100 seconds |
| $t_{90}$ | = | 396 seconds. |

The characterization of the scorching times by Mooney viscosimetry (135° C.) gave the following results:

| $ts_3$ | = | 47 min and 18 sec |
|---|---|---|
| $ts_{10}$ | = | 74 min and 1 sec. |

From the comparison of the results of examples 1 (comparative) and 3 it can be noticed that they are comparable.

EXAMPLE 4

Example 3 was repeated, by utilizing the two master prepared therein after a storage of 12 months.

The ODR curve data at 170° C. (oscillating arc=3°; oscillating frequency 100 cycles/minute) are:

| MH | = | 63.40 pounds.inch |
|---|---|---|
| $ts_2$ | = | 63 seconds |
| $ts_5$ | = | 81 seconds |
| $t_{10}$ | = | 102 seconds |
| $t_{90}$ | = | 400 seconds. |

The characterization of the scorching times by Mooney viscosimetry (135° C.) gave the following results:

$ts_3$=47 min and 30 sec $ts_{10}$=74 min and 58 sec.

EXAMPLE 5 (comparative)

Example 1 has been repeated but using triallylisocyanurate (TAIC) instead of TAC.

It was used 4.3 phr of masterbatch for cross-linking the rubber of example 1.

The data of the ODR curve at 175° C. were the following:

| MH | = | 57.22 pounds.inch |
|---|---|---|
| $ts_2$ | = | 96 seconds |
| $ts_5$ | = | 127 seconds |
| $t_{10}$ | = | 128 seconds |
| $t_{90}$ | = | 698 seconds. |

EXAMPLE 6 (comparative)

The compound of example 5 has been stored for 7 months and then it has been used for cross-linking as in example 5.

The data of the ODR curve at 175° C. were the following:

| MH | = | 54.86 pounds.inch |
|---|---|---|
| $ts_2$ | = | 105 seconds |
| $ts_5$ | = | 136 seconds |
| $t_{10}$ | = | 154 seconds |
| $t_{90}$ | = | 744 seconds. |

From the comparison between examples 5 and 6 it can be noted that the scorch resistance properties are maintained but MH is decreased of about 4% and contemporaneously $t_{90}$ is increased of 46 seconds. Therefore if it is used the same time $t_{90}$ of the compound without storage (Ex 5), MH is further decreased.

On the contrary the comparison between examples 3 and 4, compounds according to the present invention, show a better balance of properties which permit to use the same production cycle by using the compound freshly prepared or after storage.

We claim:

1. Peroxidic compositions for curing elastomers and polyolefins having scorch resistance properties which comprises:
   (a) a peroxide selected between α,α'-bis(t-butylperoxy)-diisopropylbenzene or α, α'-bis(t-amylperoxy)-diisopropylbenzene, in powder or in the form of granules or master batch and separately therefrom,
   (b)+(c) an inhibitor and promoter in powder form, granule or master batch;
   wherein (b) is an inhibitor derived from hydroquinone and (c) is a curing promoter.

2. Peroxidic compositions having retardant properties according to claim 1, wherein component (a) is a peroxide for curing elastomers, component (b) is selected from the hydroquinone derivatives having the formula

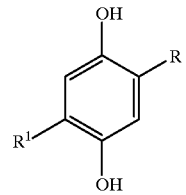

(I)

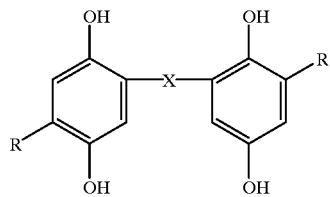

(II)

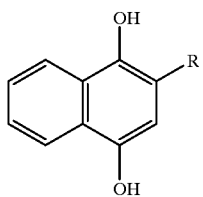

(III)

wherein R and $R^1$, equal to or different from each other, have the meaning of hydrogen, ter-alkyl, ter-cycloalkyl or aryl-t-alkyl; X=alkylene $C_1$–$C_{18}$ optionally substituted by alkyl, alkoxy, aromatic or cycloaliphatic groups. Preferably X is —CH$_2$CH=CHCH$_2$—, —CH$_2$—, —CH(CH$_3$)—(CH$_3$)$_2$C— or —C(CH$_3$)$_2$—C$_6$H$_4$—C(CH$_3$)$_2$—; the hyroquinones of formula III can have the benzenic ring, not containing the OH group, but containing ethylic groups as substituents, the component (c) is selected from the compounds containing at least two polymerizable, bifunctional or polyfunctional double bonds C=C.

3. Peroxidic compositions having scorch retardant properties according to claim 1, wherein component (a) is utilized under the form of master batch, the mixture (b)+(c) under the form of master batch.

4. Peroxidic compositions having scorch retardant properties according to claim 1, wherein (a) is selected from the dialkylperoxides, perketals, periesters class.

5. Peroxidic compositions having scorch retardant properties according to claim 1, wherein component (c) is chosen from di and poli(meth)acrylates, vinylic, allylic momomers, TAC, TAIC, triallylphosphate, triallyltrimethyllate, triallylcitrate, diallylterephthalate, diallyladipate, trimethylolpropane trimethacrilate (TMPTM), ethylenglycol dimethacrylate, trimethylolpropantriacrylate, diallylfumarate, diallylmaleate, m-phenylene bismaleimide; the compound (b) is selected from mono-t-butylhydroquinone, mono-t-amyl-hydroquinone, 2,5 di t-amylhydroquinone.

6. Peroxidic compositions having scorch retardant properties according to claim 1, wherein the amount of component (a) with respect to the polymer to be cured ranges from 1–8%, the amount of inhibitor(b) with respect to the polymer ranges from 0.1–0.5% by weight, the amount of (c) with respect to the final polymer ranges from 0.2–2% by weight; the weight ratio between (a) and the sum of (b)+(c) is comprised between 5:1 and 1:2, the ratio by weight between components (b) and (c) in the mixture (b)+(c) is comprised between 1:2 and 0.5:3.

* * * * *